United States Patent [19]

Ohhashi et al.

[11] 4,392,243
[45] Jul. 5, 1983

[54] TRANSCEIVER HAVING INTERPHONE SYSTEM

[75] Inventors: Shiro Ohhashi; Fumiyoshi Ubusawa; Shoji Iwasaki; Tetsuyuki Manaka, all of Toda, Japan

[73] Assignee: Clarion Co., Ltd., Tokyo, Japan

[21] Appl. No.: 252,570

[22] Filed: Apr. 9, 1981

[30] Foreign Application Priority Data

Apr. 9, 1980 [JP] Japan ................................. 55-45680

[51] Int. Cl.³ ............................................. H04B 1/40
[52] U.S. Cl. ................................ 455/74; 179/1 VE; 179/2 B; 179/2 E; 455/78; 455/89; 455/99; 455/345

[58] Field of Search ....................... 455/74, 73, 78, 84, 455/88, 89, 98, 99, 345; 179/1 H, 1 VE, 1 SW, 1 UW, 2 B, 2 E

[56] References Cited

U.S. PATENT DOCUMENTS

| | | |
|---|---|---|
| 2,141,323 | 12/1938 | Troisi ................................. 179/1 H |
| 2,616,973 | 11/1952 | Mantz ................................. 179/2 E |
| 3,999,015 | 12/1976 | Snyder et al. ................... 179/1 VE |
| 4,206,409 | 6/1980 | McKinney ........................... 455/89 |

Primary Examiner—Marc E. Bookbinder
Attorney, Agent, or Firm—Flynn, Thiel, Boutell & Tanis

[57] ABSTRACT

A transceiver having an interphone system which is comprised of two transmitter and receiver units, a transceiver, an interphone and switching means for selectively connecting the transmitting and receiving units to the transceiver or the interphone.

3 Claims, 4 Drawing Figures

TRANSCEIVER HAVING INTERPHONE SYSTEM

BACKGROUND OF THE INVENTION

1. Field of the Invention

This invention relates to a transceiver, and more particularly to a transceiver having an interphone system.

2. Description of the Prior Art

To facilitate conversation, for example, between persons on one motorcycle, CB transceivers for motorcycles are commonly used. However, if ambient noise is loud, it is difficult to make such conversation.

SUMMARY OF THE INVENTION

It is therefore an object of the present invention to provide a transceiver having an interphone system which enables easy conversation even under noisy conditions.

In accordance with the present invention, there is provided a transceiver having an interphone system which comprises:
- two sets of transmitter means;
- two sets of receiver means;
- two sets of push-to-talk switches;
- a radio transmitting means operative in response to operation of the push-to-talk switches;
- a radio receiving means connected to said two sets of receiver means;
- an interphone means connected to said two sets of receiver means; and
- a first and a second switch for selectively connecting said transmitter means to said interphone means or to said radio transmitting means in response to the operation of said push-to-talk switch.

BRIEF DESCRIPTION OF THE EMBODIMENT

DESCRIPTION OF THE EMBODIMENT

Figure 1:
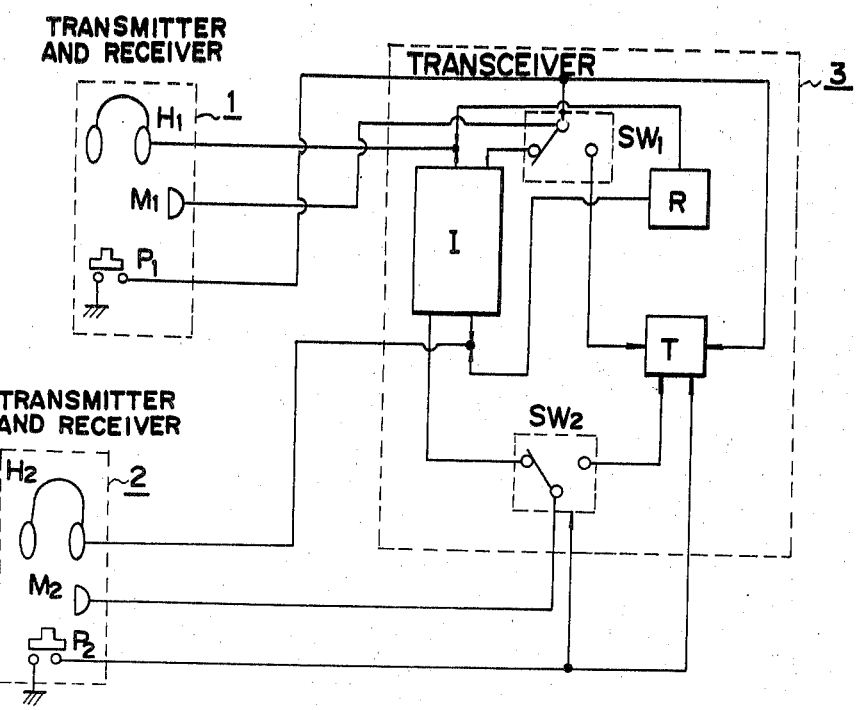
FIG. 1 is a block diagram of one embodiment of the present invention.
Figure 2:
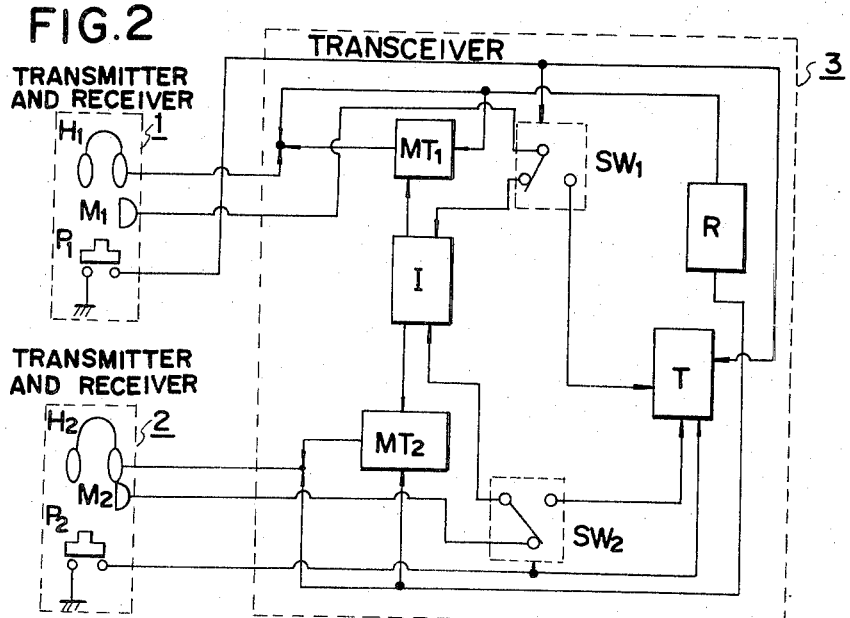
FIGS. 2, 3 and 4 are block diagrams of various modifications of the embodiment illustrated in FIG. 1, respectively.

Referring now to FIG. 1, there is illustrated one embodiment of the present invention. In FIG. 1, 1 and 2 each designates a transmitter and receiver unit and 3 designates a transceiver having an interphone system. The transmitter and receiver units 1 and 2 are comprised of headphones (or loudspeakers or other audio sound transducer) $H_1$ and $H_2$, microphones $M_1$ and $M_2$ and push-to-talk switches $P_1$ and $P_2$, respectively. The transceiver 3 includes a radio transmitter T, a radio receiver R, an interphone means I and switches $SW_1$ and $SW_2$ adapted to effect switching in response to the operations of the push-to-talk switches $P_1$ and $P_2$, respectively.

When this arrangement is used as an interphone, the push-to-talk switches $P_1$ and $P_2$ are not depressed and are kept OFF. In this state, since the switches $SW_1$ and $SW_2$ are connected to the interphone means I, speech transmitted through the microphones $M_1$ and $M_2$ will reach the headphones $H_1$ and $H_2$ to allow two-way communication, for example, between persons on one motorcycle.

Under these conditions, if a radio wave is received by the transceiver 3, an output of the radio receiver R is applied to the headphones $H_1$ and $H_2$ so that the contents of the received radio wave can be heard.

Figure 3:
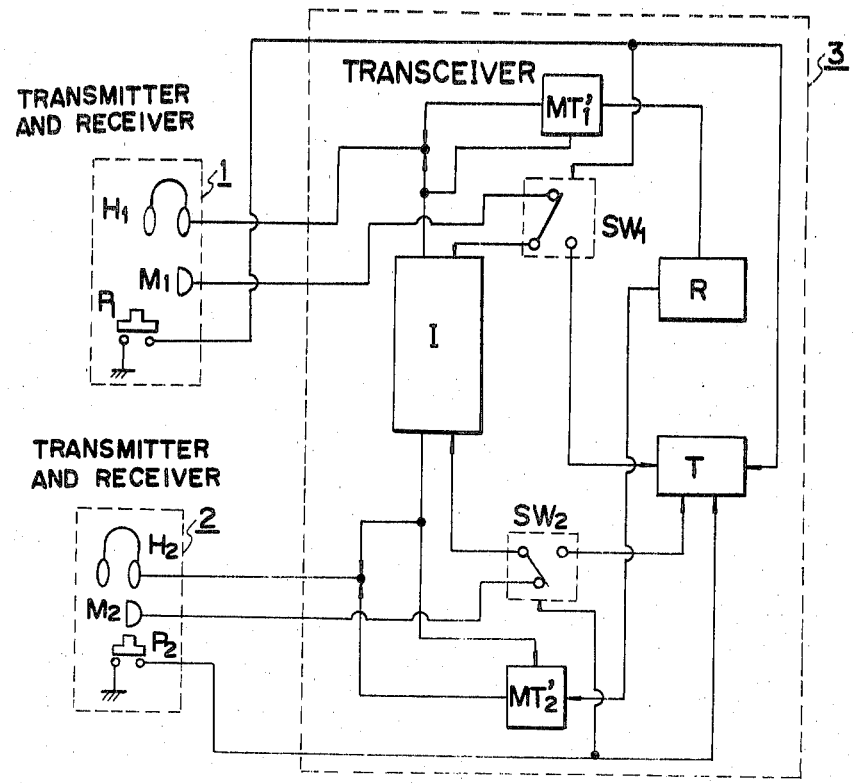

To preferentially hear the reception output of the transceiver 3, muting circuits $MT_1$ and $MT_2$ may be provided as illustrated in FIG. 2 so that an interphone output may be muted by the transceiver reception output. On the other hand, to prefer the interphone output, muting circuits $MT'_1$ and $MT'_2$ may be provided as illustrated in FIG. 3 so that the transceiver reception output may be muted by the interphone output.

Figure 4:
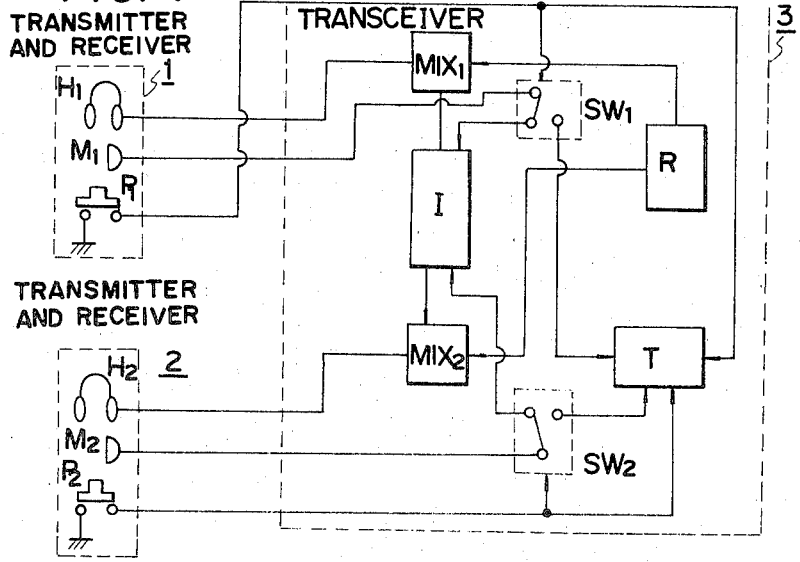

Mixing circuits $MIX_1$ and $MIX_2$ may be provided as illustrated in FIG. 4 so that mixture of the transceiver reception output and the interphone output may be heard through the headphones $H_1$ and $H_2$.

When the arrangement of FIG. 1 is used as a transceiver, the push-to-talk switch $P_1$ or $P_2$ is depressed to make a circuit. In response to the actuation of the switch, the switch $SW_1$ or $SW_2$ associated with the depressed switch is connected to the radio transmitter. As a result, speech can be transmitted through the microphone $M_1$ or $M_2$. In this case, the system may easily be modified so as to allow speech to be transmitted under such conditions that both the push-to-talk switches $P_1$ and $P_2$ are depressed or speech may be transmitted in a predetermined preferential sequence.

As apparent from the foregoing description, according to the present invention, conversation can be made smoothly even under noisy conditions, using the interphone system provided in the transceiver. In addition, the arrangement of the present invention can be obtained without increasing the number of substantial parts, because there is no need to provide a microphone for each of the interphone and the transceiver and an amplifier included in the transceiver may be used also for an interphone.

The embodiments of the invention in which an exclusive property or privilege is claimed are defined as follows:

1. A transceiver having an interphone system, comprising:
   - two microphones;
   - two audio transducers;
   - two manually operable switches;
   - radio transmitter means;
   - radio receiver means connected to said transducers;
   - an interphone circuit;
   - first and second switch means each responsive to a respective one of said manually operable switches for selectively connecting a respective one of said microphones to one of said interphone circuit and said radio transmitter means; and
   - first and second muting means operatively coupling said interphone circuit to respective ones of said transducers and responsive to signals output to said transducers by said radio receiver means for muting output signals from said interphone circuit.

2. A transceiver having an interphone system, comprising:
   - two microphones;
   - two audio transducers;
   - two manually operable switches;
   - radio transmitter means;
   - radio receiver means;
   - an interphone circuit connected to said transducers;
   - first and second switch means each responsive to a respective said manually operable switch for selectively connecting a respective said microphone to one of said interphone circuit and said radio transmitter means; and first and second muting means operatively coupling said radio receiver means to respective said transducers and responsive to signals output to said transducers by said interphone circuit for muting output signals from said radio receiver means.

3. A transceiver having an interphone system, comprising:

two microphones;
two audio transducers;
two manually operable switches;
radio transmitter means;
radio receiver means;
an interphone circuit;
first and second mixing means for mixing an output from said interphone circuit and an output from said radio receiver means to obtain respective mixed outputs and for supplying said mixed outputs to respective ones of said transducers; and
first and second switch means each responsive to a respective one of said manually operable switches for selectively connecting a respective one of said microphones to one of said interphone circuit and said radio transmitter means.

* * * * *

UNITED STATES PATENT AND TRADEMARK OFFICE
CERTIFICATE OF CORRECTION

PATENT NO. : 4 392 243
DATED : July 5, 1983
INVENTOR(S) : Shiro Ohhashi, Fumiyoshi Ubusawa,
Shoji Iwasaki and Tetsuyuki Manaka It is certified that error appears in the above—identified patent and that said Letters Patent is hereby corrected as shown below:

Column 2, line 67; after "respective" insert ---one of---.
change "switch" to ---switches---.
line 68; after "respective" insert ---one of---.
change "microphone" to ---microphones---.
Column 3, line 4; after "respective" insert ---ones of---.

Signed and Sealed this

Thirteenth Day of September 1983

[SEAL]

Attest:

GERALD J. MOSSINGHOFF

Attesting Officer  Commissioner of Patents and Trademarks